United States Patent
Qiu et al.

(10) Patent No.: US 10,705,189 B2
(45) Date of Patent: Jul. 7, 2020

(54) MULTI-BEAM LIDAR SYSTEMS WITH TWO TYPES OF LASER EMITTER BOARDS AND METHODS FOR DETECTION USING THE SAME

(71) Applicant: SUTENG INNOVATION TECHNOLOGY CO., LTD., Shenzhen (CN)

(72) Inventors: Chunxin Qiu, Shenzhen (CN); Letian Liu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/693,157

(22) Filed: Nov. 22, 2019

(65) Prior Publication Data

US 2020/0103505 A1 Apr. 2, 2020

Related U.S. Application Data

(63) Continuation of application No. PCT/CN2019/109163, filed on Sep. 29, 2019.

(30) Foreign Application Priority Data

Sep. 30, 2018 (CN) .......................... 2018 1 1155659
Sep. 30, 2018 (CN) .......................... 2018 1 1156658

(51) Int. Cl.
*G01C 3/08* (2006.01)
*G01S 7/481* (2006.01)
*G01S 7/4863* (2020.01)
*G01S 17/931* (2020.01)

(52) U.S. Cl.
CPC .......... *G01S 7/4815* (2013.01); *G01S 7/4863* (2013.01); *G01S 17/931* (2020.01)

(58) Field of Classification Search
CPC ..... G01S 7/4815; G01S 7/4863; G01S 17/931
See application file for complete search history.

(56) References Cited

U.S. PATENT DOCUMENTS

| 2011/0216304 | A1 | 9/2011 | Hall | |
| 2018/0095165 | A1* | 4/2018 | Cohen | G02B 19/0009 |
| 2018/0267152 | A1* | 9/2018 | McMichael | G01S 7/484 |

FOREIGN PATENT DOCUMENTS

| CN | 205749898 U | 11/2016 |
| CN | 107121683 A | 9/2017 |
| CN | 206975215 U | 2/2018 |
| CN | 207623515 U | 7/2018 |

(Continued)

OTHER PUBLICATIONS

International Search Report and Written Opinion in corresponding International Application No. PCT/CN2019/109163, dated Jan. 2, 2020, 11 pages.

*Primary Examiner* — Samantha K Abraham
(74) *Attorney, Agent, or Firm* — Bayes PLLC

(57) ABSTRACT

The present disclosure provides a multi-beam LiDAR system. The multi-beam LiDAR system includes a transmitter having an array of laser emitters. Each laser emitter is configured to emit a laser beam. The laser emitter array includes a first type of laser emitter board and a second type of laser emitter board. The second type of laser board includes two or more laser emitters. The second type of laser emitter board is not parallel to a predefined plane.

16 Claims, 9 Drawing Sheets

(56) References Cited

FOREIGN PATENT DOCUMENTS

| CN | 108508431 A | 9/2018 |
|---|---|---|
| CN | 108957423 A | 12/2018 |
| CN | 108957424 A | 12/2018 |
| CN | 209117861 U | 7/2019 |
| CN | 209117862 U | 7/2019 |

\* cited by examiner

MULTI-BEAM LIDAR SYSTEMS WITH TWO TYPES OF LASER EMITTER BOARDS AND METHODS FOR DETECTION USING THE SAME

CROSS REFERENCE TO RELATED APPLICATION

This application is continuation of International Application No. PCT/CN2019/109163, filed on Sep. 29, 2019, entitled "MULTI-BEAM LIDAR SYSTEMS WITH TWO TYPES OF LASER EMITTER BOARDS AND METHODS FOR DETECTION USING THE SAME," which claims priority to Chinese Patent Application No. 201811156658.6, filed on Sep. 30, 2018, and Chinese Patent Application No. 201811155659.9, filed on Sep. 30, 2018, the entire contents of which are incorporated by reference.

TECHNICAL HELD

The present disclosure relates to optical signal detection systems and methods, such as a light detection and ranging (LiDAR) system and a method for detection using the same, and more particularly to LiDAR systems with two types of laser emitter boards for detecting objects in the surrounding environment.

BACKGROUND

Optical sensing systems, such as LiDAR systems, have been widely used in autonomous driving. LiDAR systems are used to detect the position, speed, and even contours of an object in the environment and also to produce high-definition maps. For example, a typical LiDAR system measures a distance to a target by illuminating the target with pulsed laser beams and receiving the reflected pulses with a sensor, such as a photodetector. Differences in the wavelengths and/or return time of the laser beams can then be used to calculate the distance and to make digital three-dimensional (3D) representations of the target. Because using a laser beam as the incident light can map physical features with high resolution, a LiDAR system is particularly suitable for applications such as sensing in autonomous driving and/or high-definition map surveys.

A LiDAR system normally includes a transmitter that emits pulsed laser beams. The transmitter further has one or more laser emitters. Within the same length or area of the transmitter, the more laser emitters are provided, the more laser beams the LiDAR system emits for scanning, and thus the higher resolution the LiDAR system achieves. As a result, the resolution of the LiDAR system typically depends on the density of the laser emitters provided along a direction or within an area of the transmitter.

Existing multi-beam LiDAR systems include multiple laser emitters. In order to achieve higher resolution of detection, the conventional wisdom is to mount as many laser emitters as possible. Therefore, the transmitter circuits of the system have grown highly complicated along with the increasing size thereof. Also, the existing arrangement of laser emitters on laser emitter boards renders the existing LiDAR systems difficult to obtain satisfying resolution in the middle part of its field of view, and consequently fails to acquire information from this region of interest (ROI) for subsequent data processing and point cloud reconstruction. Other problems which traditional LiDAR systems suffer from include sophisticated internal structure, high overall weight, and short life cycles.

Embodiments of the present disclosure address the above problems by providing LiDAR systems using multi-beam laser emitters with two types of laser emitter boards and also methods for detecting objects in the surrounding environment using the same.

SUMMARY

Embodiments of the disclosure provide a multi-beam LiDAR system. The multi-beam LiDAR system includes a transmitter having an array of laser emitters. Each laser emitter is configured to emit a laser beam. The laser emitter array includes a first type of laser emitter board and a second type of laser emitter board. The second type of laser emitter board includes two or more laser emitters. The second type of laser emitter board is not parallel to a predefined plane.

Embodiments of the disclosure also provide a method for detection by a multi-beam LiDAR system. The method includes emitting a first type of laser beam cluster and a second type of laser beam cluster by a transmitter. Each laser beam cluster has a plurality of laser beams. The vertical density of the first type of laser beam cluster is smaller than that of the second type of laser beam cluster. The transmitter has an array of laser emitters. The laser emitter array comprises a first type of laser emitter board and a second type of laser board. The number of laser emitters on the first type of laser emitter board is smaller than the number of laser emitters on the second type of laser emitter board. The second type of laser emitter board is not parallel to a predefined plane.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

An optical signal detection system, such as a LiDAR system, may use multiple emitters, such as laser emitters, to emit laser beams for detecting objects within the environment surrounding the LiDAR system. For example, laser emitters can emit laser light generated through optical amplification based on simulated emission of electromagnetic radiation, which in turn may correspond to electrical signals, such as current or voltage signals, from another part of the LiDAR system. The laser light may be controlled to emit, often in the form of laser beams, at certain intervals and towards certain directions. Also, the optical signal detection system may use one or more photodetectors to detect optical signals (e.g., laser light) reflected by objects. For example, a photodetector can convert optical signals to electrical signals, such as current or voltage signals. The electrical signals may be amplified by an amplifier, such as a transimpedance amplifier (TIA), for subsequent processing. When the LiDAR system detects the surrounding environment, high density of the vertically emitted laser beams enables the LiDAR system to achieve high scanning resolution. One way to achieve high density of laser beams is to align a large number of laser emitters along one direction within a certain length unit on an emitter board of a transmitter of the LiDAR system.

In a typical LiDAR transmitter, all emitters may be disposed on a single emitter board. Because of the physical limitation of the single emitter board, such as the limitation of the fabrication technique, vertical density for emitters on a single emitter board approaches its upper limit. Furthermore, the middle part of the field of view (FOV) of the LiDAR system is an as the middle part typically provides feedback of most information from the surrounding environment for a traveling vehicle, such as the other vehicles, road signs, trees, pedestrians, and obstacles. However, the conventional arrangement of laser emitters and laser emitter boards cannot catch up with the massive data and high resolution needed to detect the environment with higher accuracy.

Embodiments of the present disclosure provide an improved optical signal detection system, such as a multi-beam LiDAR system, having a laser emitter array. Through the following descriptions of various embodiments, one of skill in the art would know that the resolution and other related performance of the optical signal detection system may be improved and the function of scanning the key area may be achieved.

Figure 1:
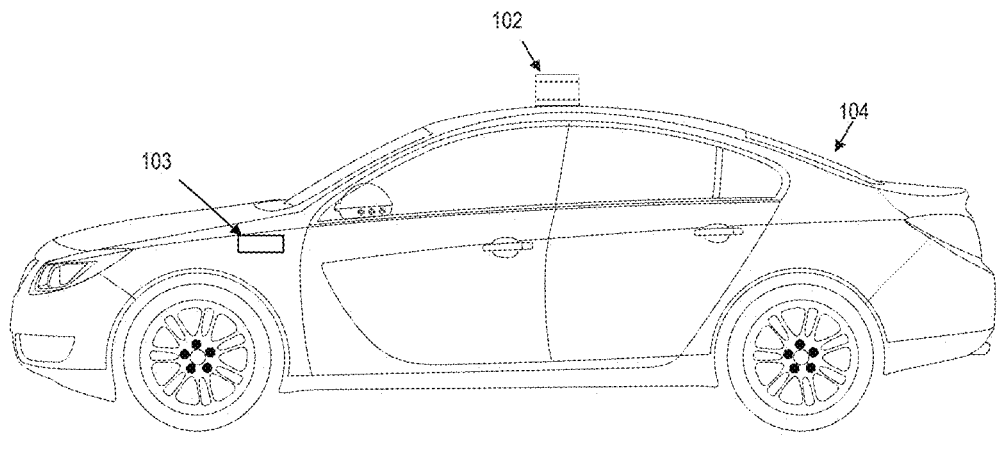
FIG. 1 illustrates a schematic diagram of an exemplary vehicle equipped with a LiDAR system, according to embodiments of the disclosure.

FIG. 1 illustrates a schematic diagram of an exemplary vehicle 100 equipped with a multi-beam LiDAR optical signal detection system 102 (or multi-beam LiDAR system 102 for simplicity), according to embodiments of the disclosure. Consistent with some embodiments, vehicle 100 may be an autonomous driving vehicle or a survey vehicle configured for acquiring data for constructing a high-definition map, 3D buildings, terrestrial features, or city modeling.

As illustrated in FIG. 1, vehicle 100 may be equipped with multi-beam LiDAR system 102 mounted to a body 104. Vehicle 100 may be additionally equipped with a sensor 103 inside or outside body 104 using any suitable mounting mechanisms. Sensor 103 may include sensors used in a navigation unit, such as a Global Positioning System (GPS) receiver, and one or more Inertial Measurement Unit (IMU) sensors. It is contemplated that the manner in which multi-beam LiDAR system 102 or sensor 103 can be mounted on or equipped with vehicle 100 is not limited to the example shown in FIG. 1. It may be modified depending on the types of multi-beam LiDAR system 102, sensor 103, and/or vehicle 100, so that the desirable sensing performance under the present disclosure may be achieved. It is contemplated that vehicle 100 may be an electric vehicle, a fuel cell vehicle, a hybrid vehicle, or a conventional internal combustion engine vehicle.

Consistent with some embodiments, multi-beam system 102 and sensor 103 may be configured to capture data as vehicle 100 moves along a trajectory. For example, a transmitter of multi-beam LiDAR system 102 is configured to scan the surrounding and acquire point clouds. Multi-beam LiDAR system 102 may include one or more LiDAR devices configured to measure distance to a target by illuminating the target with pulsed laser beams and measuring the reflected pulses with a receiver. The laser beams used by multi-beam LiDAR system 102 may be ultraviolet, visible, or near infrared. As vehicle 100 moves along the trajectory, LiDAR system 102 may continuously capture data. Each set of data captured at a certain time range is known as a data frame. Multiple data frames may be subsequently combined, with the assistance of sensor data, to construct high-definition maps.

Figure 2:
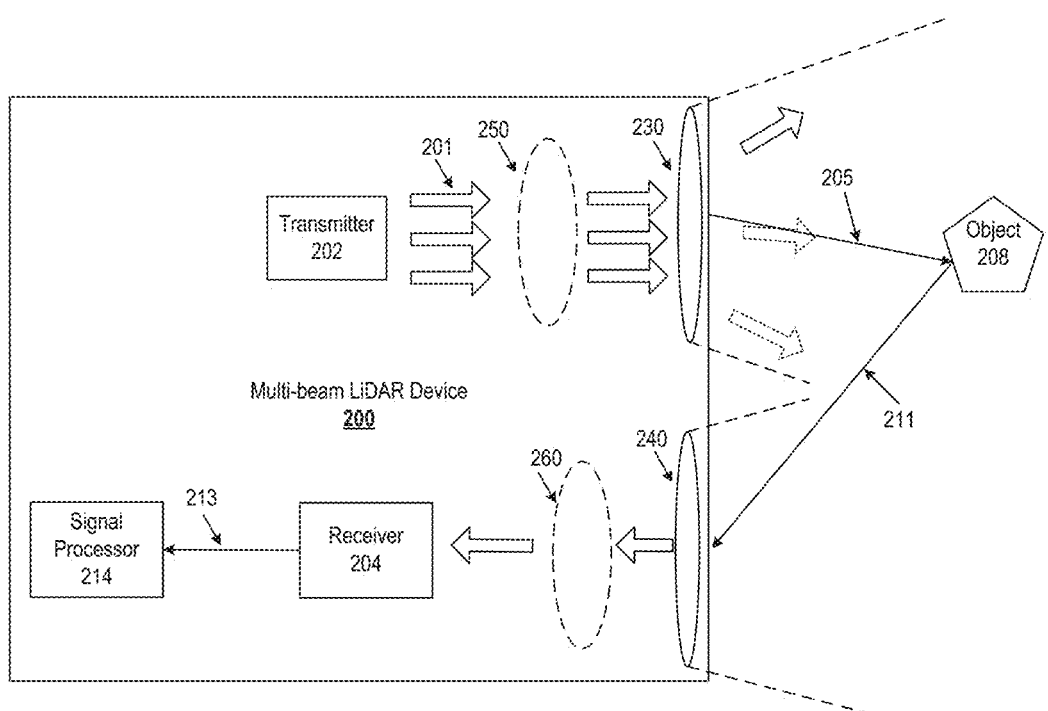
FIG. 2 illustrates a block diagram of an exemplary LiDAR device having a transmitter and a receiver, according to embodiments of the disclosure.

FIG. 2 illustrates a block diagram of an exemplary LiDAR optical signal detection device 200 (or LiDAR device 200 for simplicity), such as that used in multi-beam LiDAR system 102. Multi-beam LiDAR device 200 may include a transmitter 202 and a receiver 204. Transmitter 202 may emit laser beams within a scan angle as it moves (e.g., rotates, swings, etc.). The scan angle can be a horizontal angle, a vertical angle, or a combination of both. Transmitter 202 may include a laser source (not shown) that further includes multiple laser beams. Each laser emitter may emit a laser beam. Thus, transmitter 202 may emit multiple laser beams 201. Laser beams 201 may be collimated by a collimator (not shown) so that parallel beams may be produced. In some embodiments, the collimator may be provided between transmitter 202 and transmitter reflection mirror group 250. In other embodiments, the collimator may be provided as part of a transmitter optical unit, which may collimate laser beams 201.

In some embodiments, transmitter reflection mirror group 250 may be configured to redirect laser beams 201 emitted from transmitter 202 for collimation by transmitter optical unit 230. In other embodiments, transmitter reflection mirror group 250 may not be needed when the internal design of transmitter 202 does not require redirection of laser beams 201 therein.

Consistent with the embodiments of the present disclosure, the laser source may generate laser beams in the ultraviolet, visible, or near infrared wavelength range. It is understood that any suitable laser emitter may be used as an emitter in the laser emitter array for emitting laser beams 201.

In some embodiments, when leaving multi-beam LiDAR device 200, one of the multiple laser beams 201, laser beam 205, may be projected to an object 208 in a first direction. Object 208 that reflects laser beam 205 may include a wide range of objects, including, for example, metallic objects, non-metallic objects, vehicles, bicycles, pedestrians, billboards, road signs, cement pavements, rocks, rain, chemical compounds, aerosols, clouds, and even single molecules.

In some embodiments, receiver 204 may be configured to detect a return beam 211 that is reflected by object 208 from laser beam 205. Receiver 204 can collect return beams reflected by object 208 and output electrical signals indicating the intensity of the return beams. Although only one laser beam is shown in FIG. 2, a person of ordinary skill in the art would understand that two or more laser beams may be emitted from multi-beam LiDAR device 200, reflected by object 208, and received by receiver 204 as return beams.

As illustrated in FIG. 2, multi-beam LiDAR device 200 may include a receiver optical unit 240, an optional receiver reflection mirror group 260 and a receiver 204. Receiver optical unit 240 may be configured to collect and focus light from all directions within its FOV. Receiver reflection mirror group 260 may be configured to redirect the laser beams collected and focused by receiver optical unit 240 for reception by receiver 204. As an example, return beam 211 may be collected and focused by receiver optical unit 240 and then be redirected to receiver 204. Return beam 211 may be reflected by object 208 and have the same wavelength as laser beam 205. Similar to transmitter reflection mirror group 250, receiver reflection mirror group 260 may not be needed when the internal design of receiver 204 does not require redirection of return beam 211.

Receiver 204 may include a photodetector array (not shown), which may further include a plurality of photodetectors and may be configured to detect return beam 211 reflected by object 208. In some embodiments, each of the photodetectors in the photodetector array may convert a laser light (e.g., return beam 211), which is collected and focused by receiver optical unit 240 and optionally redirected by receiver reflection mirror group 260, into an electrical signal 224 (e.g., a current or a voltage signal). Electrical signal 224 may be generated when photons are absorbed in a photodiode. It is understood that any suitable photodiode may be used as a photodiode in the photodiode array for receiving return beams 211.

In some embodiments, multi-beam LiDAR device 200 may include a signal processor 214 configured to process electrical signal 213. The processed signals may be subsequently used to reconstruct point clouds that simulate the surrounding environment of the traveling vehicle.

Figure 3:
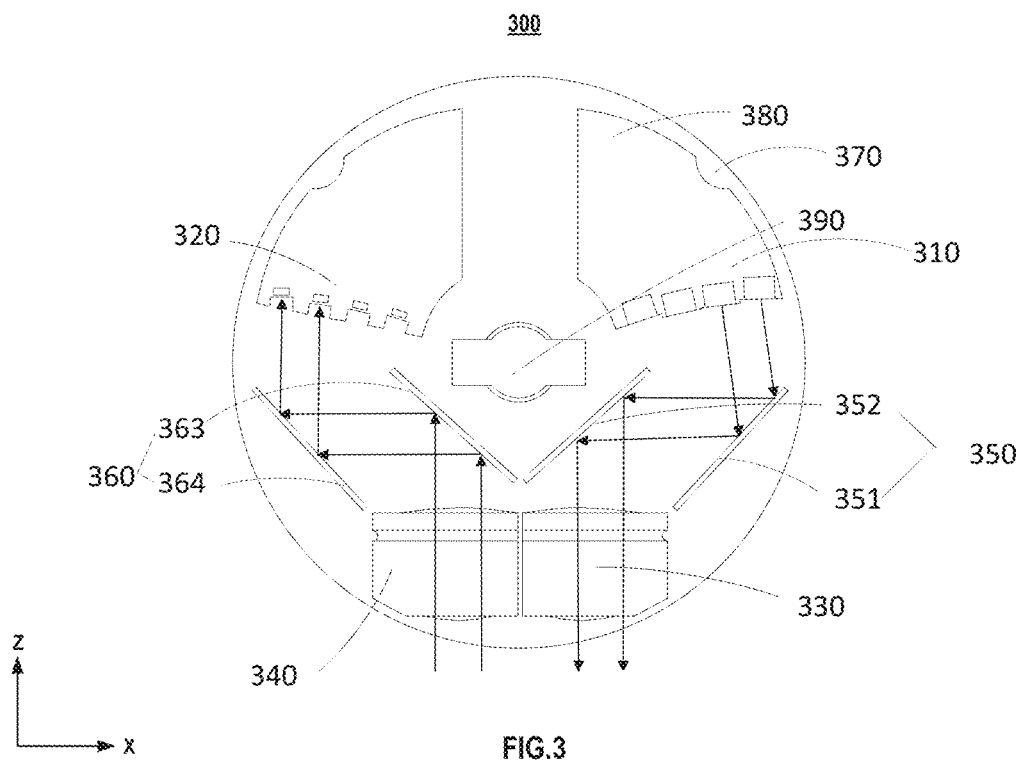
FIG. 3 illustrates a top view of an exemplary multi-beam LiDAR system, according to embodiments of the disclosure.

FIG. 3 illustrates a top view of an exemplary multi-beam LiDAR system 300, according to embodiments of the disclosure. The plane on which the top view is illustrated may be defined by x-axis and z-axis, or simply "x-z plane." In some embodiments, multi-beam LiDAR system 300 may include a transmitter having a laser emitter array 310. The term "array" as used herein means a group of elements forming a complete unit. The array is not limited to an orderly arrangement of such elements (e.g., laser emitters). The elements may be arranged in any manner as long as the purpose and result of the current disclosure are achieved.

Consistent with embodiments of the present disclosure, laser emitter array 310 may have a first type of laser emitter boards and a second type of laser emitter boards. Laser emitter array 310 may include a plurality of laser emitter boards. Each laser emitter board may include one or more laser emitters. In some embodiments, multi-beam LiDAR system 300 may further include a receiver having a photodetector array 320. Photodetector array 320 may include a plurality of photodetector boards. Each photodetector board may include one or more photodetectors.

Figure 4:
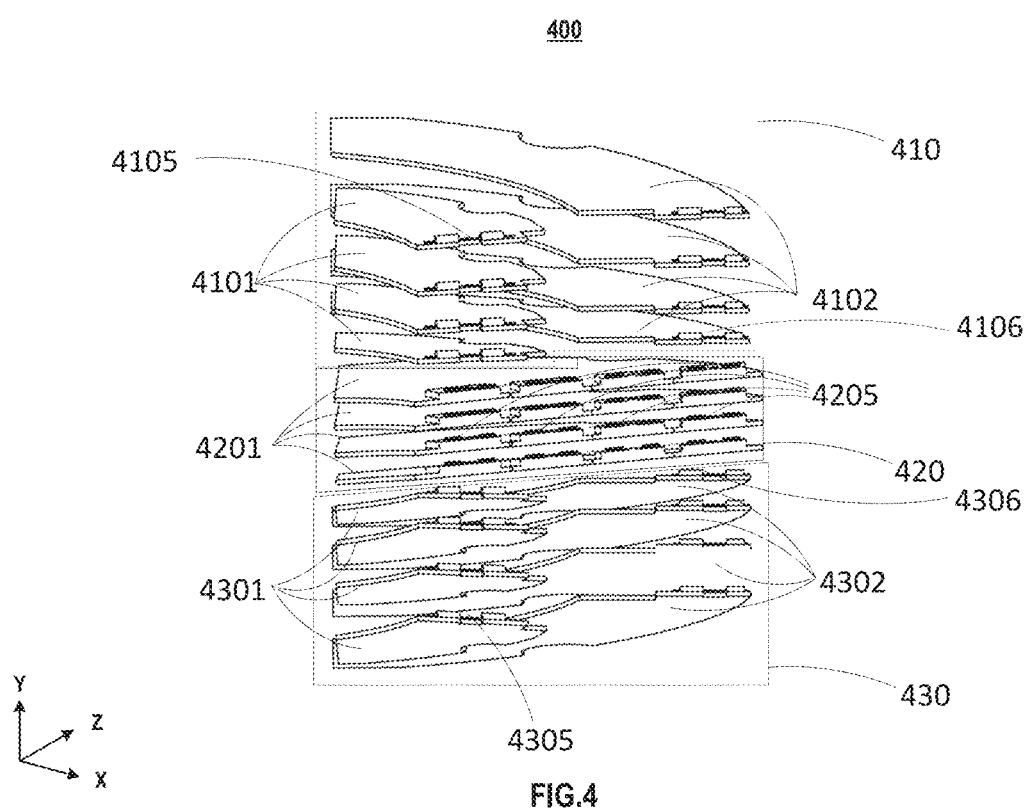
FIG. 4 illustrates a schematic diagram of an exemplary laser emitter array of the multi-beam LiDAR system, according to embodiments of the disclosure.

FIG. 4 illustrates a schematic diagram of an exemplary laser emitter array 400 of multi-beam LiDAR system 300, according to embodiments of the disclosure. Laser emitter array 400 may be implemented as laser emitter array 310 in FIG. 3. According to the present disclosure, laser emitter array 400 may include two distinctive types of laser emitter boards, first type of laser emitter board and second type of laser emitter board.

For example, as illustrated in FIG. 4, laser emitter array 400 may include sixteen first type of laser emitter boards 4101, 4102, 4301, 4302 and four second type of laser emitter boards 4201. It is noted that the number of laser emitter boards is not limited to the example shown in FIG. 4. According to the present disclosure, the minimum number of the first type of laser emitter board may be one, and the minimum number of the second type of laser emitter board may also be one.

The embodiments illustrated by FIG. 4 further demonstrate that, with respect to the second type of laser emitter boards 4201 along a vertical direction (e.g., in the y-axis direction, which is perpendicular to the x-z plane), eight first type of laser emitter boards 4101, 4102 are positioned thereabove and the other eight first type of laser emitter boards 4301, 4302 are positioned thereunder. The eight first type of laser emitter boards 4101, 4102 may form a first group of laser emitter boards 410. The four second type of laser emitter boards 4201 may form a second group of laser emitter boards 420. The eight first type of laser emitter boards 4301, 4302 may form a third group of laser emitter boards 430. The second group 420 is disposed between the first group 410 and the third group 430. It is understood that the number of laser emitter boards in one group is not limited to four or eight. In some embodiments, each group of first type of laser emitter boards may include one or more such boards. In other embodiments, the group of second type of laser emitter boards may include one or more such boards.

It is further noted that the relative position and number of the first type and second type of laser emitter boards are not limited to the example shown in FIG. 4. In one example, there can be at least one first type of laser emitter board above one second type of laser emitter board. In another example, there can be at least one first type of laser emitter board under one second type of laser emitter board. In yet another example, there can be at least two first type of laser emitter boards on each of the upper and lower sides of the second type of laser emitter board(s).

With respect to each second type of laser emitter board, it may include two or more laser emitters, according to the present disclosure. In some embodiments, the second type of laser emitter board may not be parallel to a predefined plane. As a result, the multiple laser beams emitted from the two or more laser emitters on the second type of laser emitter board may not coincide with each other, thus increasing the density of outgoing laser beams, which may increase the resolution of detection by the multi-beam LiDAR system.

Consistent with embodiments of the present disclosure, the predefined plane may be a two-dimensional plane (e.g., x-z plane) defined in a three-dimensional coordinate system (e.g., x-y-z coordinate system), in which the vertical direction (e.g., y-axis direction) is the direction along which laser beam density is the focus of the present disclosure. As real-world examples, the predefined plane may be a plane parallel to the sea level, a horizontal plane, or a plane that the vehicle mounted with the multi-beam LiDAR system is traveling (such as a road surface, a hill slope, etc.).

Consistent with some embodiments of the present disclosure, the second type of laser emitter board may tilt on one side (e.g., one end of the board) to create a position that is non-parallel to the predefined plane. For ease of reference, such a laser emitter board is called a "tilted laser emitter board" herein. The tilting angle of the tilted laser emitter board with respect to the predefined plane may be a value within the range between 0 degree and 90 degrees, thus an acute angle. In some embodiments, the tilting angle may be between 0 degree and 30 degrees.

Figure 5A:
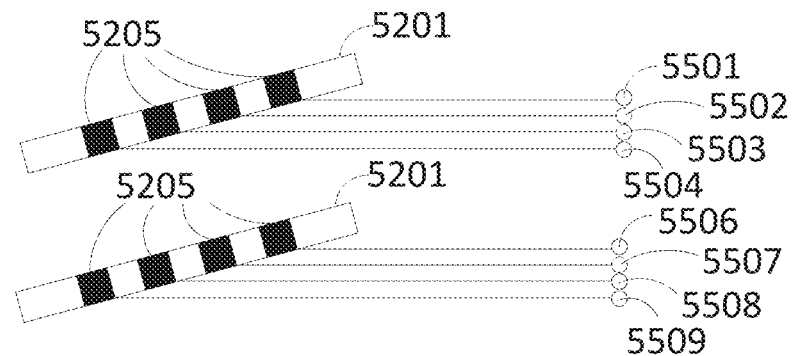
FIG. 5A illustrates a schematic diagram of exemplary light spots of laser beams emitted from two second type of laser emitter boards of the multi-beam LiDAR system, according to embodiments of the disclosure.

FIG. 5A illustrates a schematic diagram of exemplary light spots of laser beams emitted from two second type of laser emitter boards 5201 of the multi-beam LiDAR system, according to embodiments of the disclosure. The laser emitter boards 5201 may be used in multi-beam LiDAR system 300 and implemented as the second type of laser emitter boards 4201 in FIG. 4. Two tilted laser emitter boards 5201 may tilt towards the same direction (e.g., up, down, left, right, front, back, or a combination of two or more of these directions in a three-dimensional space) and may have the same tilting angle that ranges between 0 degree and 90 degrees, and preferably can be any value within the range between 0 degree and 30 degrees. In some other embodiments, the tilting directions and/or the tilting angles of different tilted laser emitter boards may vary. A person of skill in the art would choose the appropriate tilting direction or tilting angle with respect to each tilting laser emitter board to create non-coincident outgoing laser beams, so that the density of the overall laser beams emitted from the multi-beam LiDAR system may be increased. In an example illustrated in FIG. 5A, two second type of laser emitter boards 5201 tilt up along a vertical direction (e.g., y-axis direction). As a result, the laser beams may be emitted from multiple onboard laser emitters 5205 without coinciding with each other, thus forming distinctive light spots 5501, 5502, 5503, 5504, 5506, 5507, 5508, 5509 at a distance away from tilted laser emitter boards 5201. This arrangement of laser emitter boards essentially increases the number of laser beams emitted along a vertical direction (e.g., y-axis direction), and thus enhances the vertical resolution of the LiDAR system equipped with such laser emitter boards.

In some embodiments, the light spots formed by the tilted laser emitter boards may be equally distributed along the vertical direction. In other embodiments where an ROI exists, the light spots may not be equally distributed along the vertical direction and they can be concentrated within that ROI. With the teaching of the present disclosure, a person of skill in the art would learn that the distribution of the light spots along the vertical direction (thus the vertical density of the laser beams) may be controlled by adjusting one or both of (a) the tilting angle of one or more tilted laser emitter boards, and (b) the distribution of multiple laser emitters on one or more laser emitter boards.

Figure 5B:
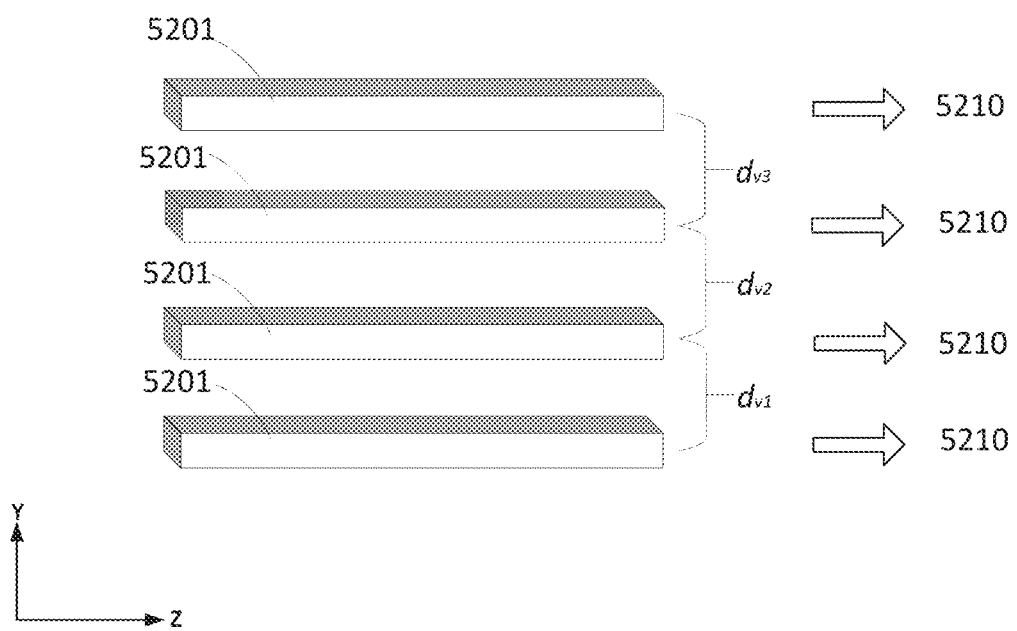
FIG. 5B illustrates a side view of an exemplary second group of laser emitter boards of the multi-beam LiDAR system, according to embodiments of the disclosure.

Consistent with embodiments of the present disclosure, the second group of laser emitter boards may be aligned along the vertical direction. Two adjacent laser emitter boards may be separated by a distance (dvk, where k=1, 2, . . . , n, while n is the number of laser emitter boards in the group). In some embodiments, each distance dv1, dv2, . . . dvn may be the same. FIG. 5B illustrates a side view of an exemplary second group of laser emitter boards 520 of the multi-beam LiDAR system 300, according to embodiments of the disclosure. Laser beams may be emitted to the right along the z-axis direction, as indicated by arrows 5210 in FIG. 5B. Each arrow 5210 may represent a cluster of laser beams emitted from one laser emitter board 5201. Although not shown in FIG. 5B, each laser emitter board 5210 may not be parallel from a predefined plane (e.g., x-z plane). In some embodiments, the front side (that is, the side where laser beams are emitted from the laser emitter mounted on the board) of two upper laser emitter boards 5201 may tilt down and that of two lower laser emitter boards 5201 may tilt up, thus directing the laser beams towards the middle part of the FOV.

As shown in FIG. 5B, each pair of two adjacent laser emitter boards 5201 may not have a substantial or any position shift in the lateral direction (e.g., z-axis direction), hence forming an aligned arrangement along the vertical direction. The distances dv1, dv2, . . . dv3 may be the same. As one example, the right side (the side of the board on the right of a viewer facing towards the emitted laser beams in FIG. 5B) of each laser emitter board 5201 may tilt up in the vertical direction, therefore making it possible to separate the multiple laser beams within one cluster of laser beams along the vertical direction, the basic principle of which has already been explained in conjunction with FIG. 5A. By doing so, the vertical density of laser of beams emitted from the multi-beam LiDAR system may also be increased. In the embodiments shown in FIG. 5B, the tilting angles of laser emitter boards 5201 may be the same. In other embodiments, the tilting angles may vary between each other.

Figure 5C:
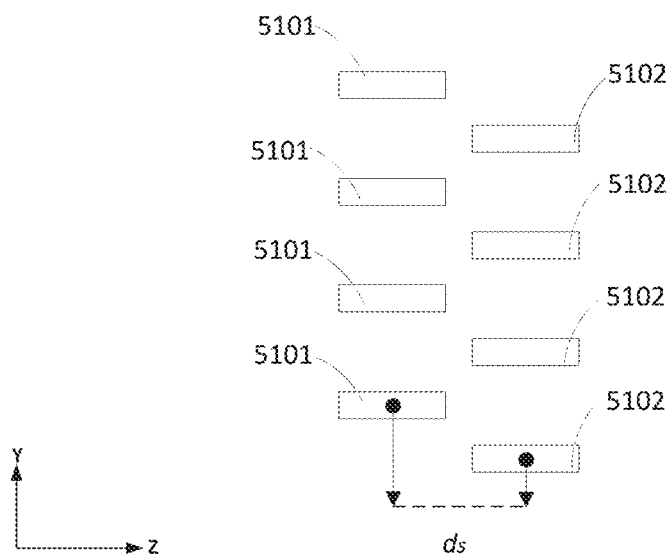
FIG. 5C illustrates a side view of an exemplary first group of laser emitter boards of the multi-beam LiDAR system, according to embodiments of the disclosure.

In the embodiments illustrated in FIG. 4, eight first type of laser emitter boards 4101, 4102 may be arranged in a staggered manner along the vertical direction (e.g., y-axis direction). The term "staggered" used herein means that the adjacent laser emitter boards along one direction have a substantial lateral position shift between each other. The term "substantial" used herein indicates a value of the position shift that varies within or beyond, for example, 50-100% of the width of the board along the shift direction (e.g., ±50%, ±60%, ±70%, ±80%, ±90%, ±100%, or any value bounded by the range). An example of the staggered arrangement of laser emitter boards 5101, 5102, which may be used in multi-beam LiDAR system 300 and implemented as laser emitter boards 4101, 4102, is illustrated in FIG. 5C. It shows a side view (e.g., from the x-axis direction) of the laser emitter boards. Each pair of two adjacent laser emitter boards 5101 and 5102 may have a substantial position shift in the lateral direction (e.g., z-axis direction), hence the staggered arrangement along the vertical direction (e.g., y-axis direction). "Adjacent laser emitter boards" means two laser emitter boards that have the shortest distance along a given direction (e.g., y-axis direction in FIG. 5C). According to these embodiments, there may not be any overlapping between projected images of two adjacent laser emitter boards 5101, 5102 when their images are projected horizontally along a lateral direction (e.g., x-axis direction) to a vertical plane (e.g., y-z plane). The amount of the shift (ds) may be measured by calculating the distance between the same reference points (e.g., the centers) of the projected images of two adjacent lase emitter boards, as illustrated in FIG. 5C. In an exemplary multi-beam LiDAR system, ds may range between a few millimeters to a few dozens of centimeters (e.g., 2 mm, 3 mm, 5 mm, 1 cm, 2 cm, 3 cm, 5 cm, 10 cm, 20 cm, 30 cm, 50 cm, or in any range defined by any two of these values). When viewed from above in the vertical direction, the projected images of the two adjacent first type of laser emitter boards 5101 and 5102 may not substantially overlap on a predefined plane (e.g., x-z plane). The term "substantially" used herein indicates a value of a given quantity that varies within, for example, 50-100% of the value (e.g., ±50%, ±60%, ±70%, ±80%, ±90%, ±100%, or any value bounded by the range).

The four laser emitter boards 5101 on the left side of FIG. 5C, which are stacked closer to the center (e.g., rotation axis) of the multi-beam LiDAR system, may be named herein as the "inner-staggered laser emitter boards." The other four laser emitter boards 5102, which are stacked further away from the center (e.g., rotation axis) than the inner-staggered laser emitter boards, may be named herein as the "outer-staggered laser emitter boards." The inner-staggered laser emitter boards may not have a substantial or any lateral position shift between any two of them. They can form a line along the vertical direction (e.g., y-axis direction), which is perpendicular to the predefined plane (e.g., x-z plane). Therefore, when reviewed from above in the vertical direction, multiple laser emitter boards 5101 may only have one projection image on the predefined plane of substantially the same size as a single laser emitter board 5101. The same arrangement may also apply to outer-staggered laser emitter boards 5102.

In other embodiments, the projected image of the inner-staggered laser emitter boards and that of the outer-staggered laser emitter boards may partially or substantially overlap, depending on the location of the laser emitters on the second type of laser emitter boards. The laser emitters on the inner-staggered laser emitter boards and outer-staggered laser emitter boards may respectively form a line along a direction with the laser emitters on the second type of laser emitter boards, thus increasing the density of laser beams along the direction.

According to embodiments of the present disclosure, the surface area of one inner-staggered laser emitter board is smaller than that of one outer-staggered laser emitter board. Thus, the overall size of the laser emitter array can be controlled while also increasing the density of laser beams and resolution of the multi-beam LiDAR system.

Figure 5D:
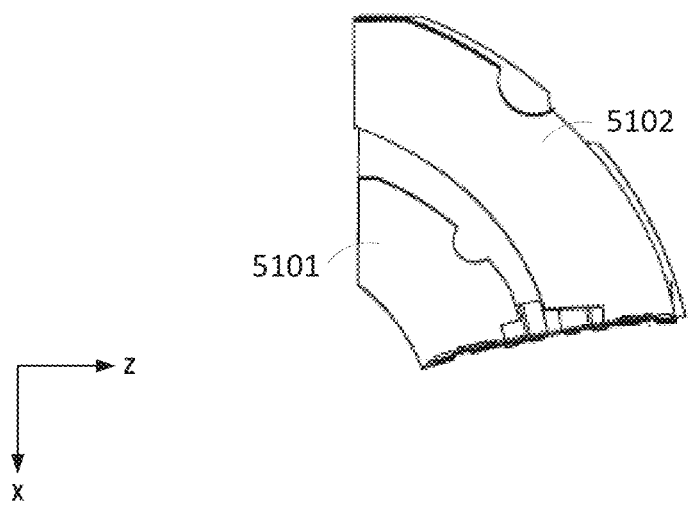
FIG. 5D illustrates a schematic diagram of an exemplary projection image on a predefined plane with respect to a first group of laser emitter boards of the multi-beam LiDAR system, according to embodiments of the disclosure.

FIG. 5D illustrates a schematic diagram of an exemplary projection image on a predefined plane with respect to the first group of laser emitter boards 410 of the multi-beam LiDAR system 300, according to embodiments of the disclosure. More specifically, when viewed from above along the vertical direction, only one projection image of inner-staggered laser emitter boards 5101 and one projection image of outer-staggered laser emitter boards 5102 can be seen. In examples where a third group of first type of laser emitter boards are provided under the second group of second type of laser emitter boards, such as in FIG. 4, the same staggered arrangement may be applied to the third group of laser emitter boards 430, which respectively include inner-staggered laser emitter boards 4301 and outer-staggered laser emitter boards 4302.

Thanks to the staggered arrangement of the laser emitter boards, the number of laser beams per unit length along a direction (e.g., vertical direction) is increased, and therefore the density of emitted laser beams along that direction is also improved. In this way, a multi-beam LiDAR system incorporating the staggered laser emitter boards may emit laser beams of higher density along that direction, thus increasing its resolution and other related performances.

According to the present disclosure, the first type and the second type of laser emitter boards may each include any number of laser emitter. As long as the manufacturing process permits, there can be 1, 2, 3, 4, 5, 10, or even dozens of laser emitters on one laser emitter board. In some embodiments, each first type of laser emitter board may include one and only one laser emitter. This may shrink the overall size of the device and simplify control of the laser emitters. FIG. 4 demonstrates such an embodiment where each of laser emitter boards 4101 has one laser emitter 4105, each of laser emitter boards 4102 has one laser emitter 4106, each of laser emitter boards 4301 has one laser emitter 4305, and each of laser emitter boards 4302 has one laser emitter 4306. In some embodiments, the number of laser emitters on a second type of laser emitter board may be larger than that of laser emitters on a first type of laser emitter board. This may increase the density of laser beams directed within an ROI, thus creating higher resolution of the surrounding environment within the FOV of the multi-beam LiDAR system. FIG. 4 demonstrates such an embodiment where each of laser emitter boards 4201 has four laser emitters 4205. Because laser emitter boards 4201 are positioned in the center area of the laser emitter array, with laser emitter boards 4101, 4102, 4301, 4302 of fewer onboard laser emitters positioned on the upper and lower sides, multi-beam LiDAR system 300 is able to emit higher density of laser beams in the middle part of its FOV.

Similar to the tilted second type of laser emitter board discussed above, at least one of the first type of laser emitter boards is not parallel to a predefined plane (e.g., the x-z plane). In some embodiments, the tilted first type of laser emitter board may tilt towards a predetermined direction (e.g., up, down, left, right, front, back, or a combination of two or more of these directions in a three-dimensional space). In other embodiments, the front side (that is, the side where laser beams are emitted from the laser emitter mounted on the board) of the tilted first type of laser emitter board tilts towards the center of the laser emitter array.

In the example illustrated in FIG. 4, an inner-staggered first type of laser emitter board 4101 may tilt towards the second group of laser emitter boards 420, which is disposed between the first group 410 and the third group 430. This allows the laser beams emitted from the multi-beam LiDAR system to concentrate towards the middle part of its FOV, and therefore increases the density of laser beams in the part that is vital to the environment sensing. As a result, more details in an ROI of the surrounding environment, including the objects therein, can be captured by a LiDAR system with one or more tilted laser emitter boards as compared to the conventional LiDAR system with non-tilted laser emitter boards.

It is understood that the tilted laser emitter board is not limited to tilting towards the center of the laser emitter array. For example, when a tilted laser emitter board tilts away from the center of the laser emitter array, the emitted laser beams may have a higher density in a peripheral part of the FOV of the multi-beam LiDAR system. In another example, when a left end or a right end of the first type of laser emitter board tilts up, the adjacent first type of laser emitter boards may not have to be staggered, as the tilting position creates a difference in elevation of laser emitters on adjacent laser emitter boards with respect to the predefined plane, thus achieving the same goal of separating outgoing laser beams as the staggered arrangement of first type of laser emitter boards when the multi-beam LiDAR system rotates.

Figure 5E:
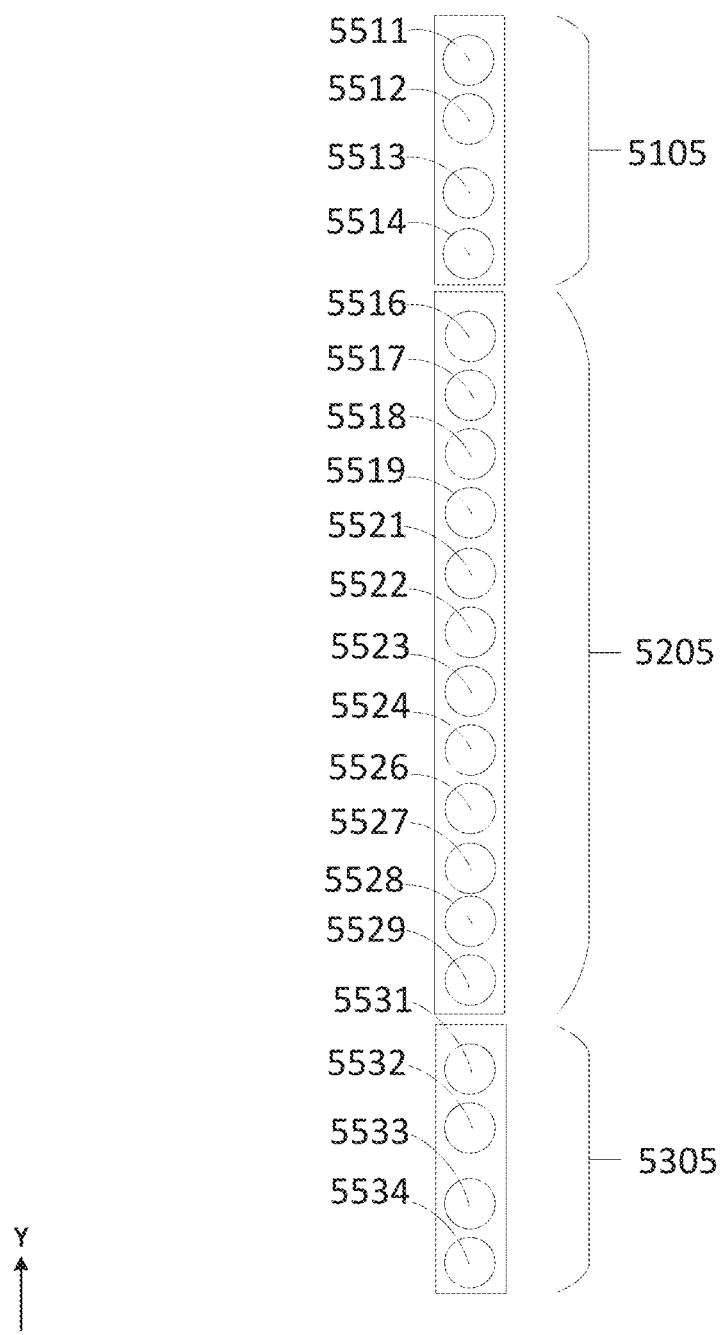
FIG. 5E illustrates a schematic diagram of exemplary light spots of beams emitted from a laser emitter array of the multi-beam LiDAR system, according to embodiments of the disclosure.

FIG. 5E illustrates a schematic diagram of exemplary light spots of beams emitted from a laser emitter array of the multi-beam LiDAR system, according to embodiments of the disclosure. The laser emitter array may include three groups of laser emitter boards. Each group of laser emitter boards may include multiple laser emitters and emit a cluster of laser beams. The laser beam clusters from the first, second, and third groups may respectively form light spot groups 5105, 5205, and 5305 at a distance away from the laser emitter boards. Group 5105 includes light spots 5511, 5512, 5513, 5514. Group 5205 includes light spots 5516, 5517, 5518, 5519, 5521, 5522, 5523, 5524, 5526, 5527, 5528, 5529. Group 5305 includes light spots 5531, 5532, 5533, 5534. The three groups of light spots do not overlap with each other, which results from the non-coincident laser beams emitted from the laser emitter array. These light spots may align along a direction (e.g., y-axis direction or vertical direction). Consequently, when the multi-beam LiDAR system rotates around an axis parallel to that direction, the system is capable of scanning the surrounding environment by using these laser beams. The light spots in each group may be equally distributed. Alternatively, they may not be equally distributed and can be adjusted according to different needs.

In some embodiments, the number of light spots per unit length in group 5205, which correspond to a cluster of laser beams emitted from the second group of laser emitters, is higher than those in the other light spot groups. Higher number of light spots indicates higher resolution the multi-beam LiDAR system may obtain. Therefore, because the second group of laser emitters are positioned in the middle part of the laser emitter array, the multi-beam LiDAR system have a higher resolution in the middle part of its FOV along the same direction as the aligned light spots.

In some embodiments according to the present disclosure, none of the laser emitters on a laser emitter board in a group of laser emitter boards is of the same elevation from a predefined plane as another laser emitter on a laser emitter board in the same group of laser emitter boards. The elevation may be calculated as the shortest distance from the laser emitter to the predefined plane, which is normally equal to the length of a line originated from the laser emitter and perpendicular to the predefined plane. Using FIG. 4 as an example, none of laser emitters 4105 in group 410 is of the same elevation from the x-z plane. In these embodiments, the laser beam density may be the highest when the number of laser emitters are predetermined, because the difference in elevation causes each emitted laser beam to be separate from another laser beam. When the group includes one or more first type of laser emitter boards, these boards may be tilted or staggered to create the different elevations of the onboard laser emitters. When the group includes one or more second type of laser emitter boards, these boards may be tilted to create the different elevations of the onboard laser emitters.

It is contemplated that the laser emitter array according to the present disclosure may include two or more types of laser emitter board, of which one type of laser emitter board includes more laser emitters than the other type or types of laser emitter board. For example, in the embodiments illustrated in FIG. 4, the second type of laser emitter boards 4201 includes more laser emitters on each board than the first type of laser emitter boards 4101, 4102, 4301, 4302.

Moreover, with respect to one multi-beam LiDAR system, the number of types of laser emitter board, the number of groups of laser emitter boards, and the number of laser emitter boards included in each group may vary according to different needs. The examples described in conjunction with the various figures herein are just for illustrative purpose and should not be construed to limit those numbers. For example, a laser emitter array consistent with the present disclosure may include 2. 3, 4, 5, 6, 7, 8, 9, 10, or more types of laser emitter board and 2, 3, 4, 5, 6, 7, 8, 9, 10, or more groups of laser emitter boards. One group of laser emitter boards may include 1, 2, 3, 4, 5, 6, 7, 8, 9, 10, or more laser emitter boards.

Figure 6:
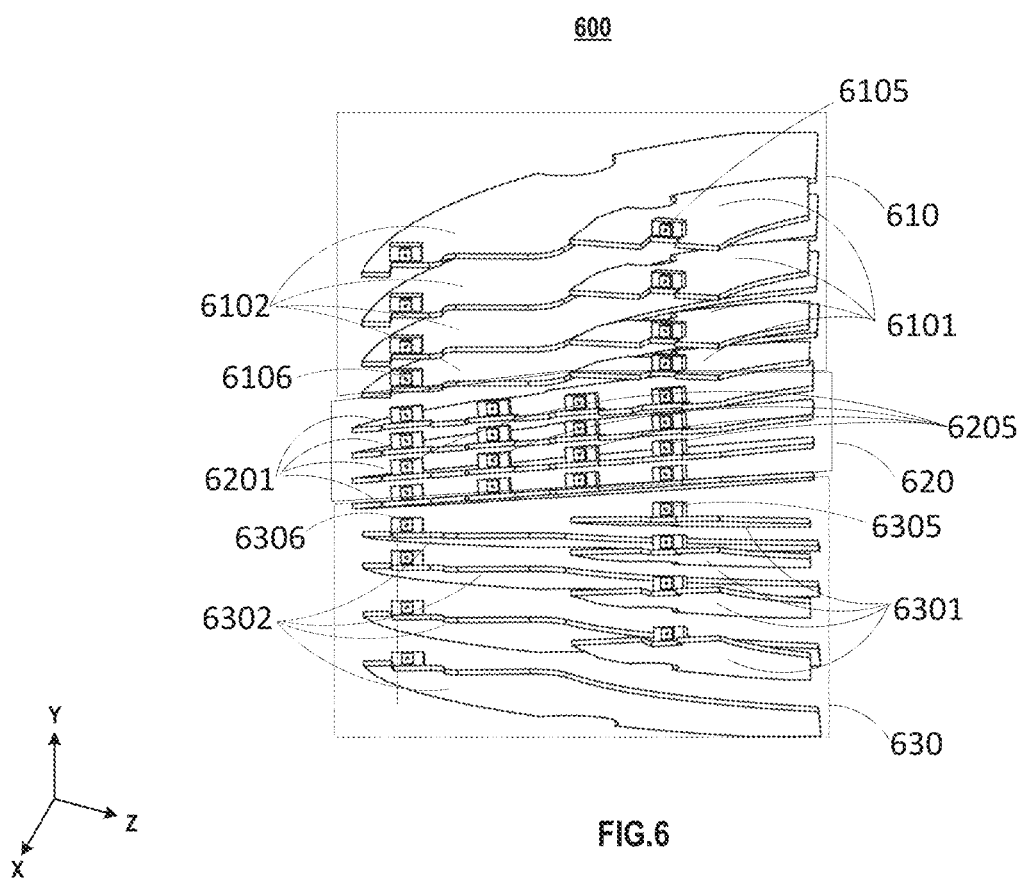
FIG. 6 illustrates a schematic diagram of an exemplary photodetector array of the multi-beam LiDAR system, according to embodiments of the disclosure.

FIG. 6 illustrates a schematic diagram of an exemplary photodetector array 600 of multi-beam LiDAR system 300, according to embodiments of the disclosure. Photodetector array 600 may be implemented as photodetector array 320 in FIG. 3. Similar to the embodiments where laser emitter array 400 includes two types of laser emitter boards, photodetector array 600 may also include two distinctive types of photodetector boards, first type of photodetector board and second type of photodetector board.

For example, as illustrated in FIG. 6, photodetector array 600 may include sixteen first type of photodetector boards 6101, 6102, 6301, 6302 and four second type of photodetector boards 6201. It is noted that the number of photodetector boards is not limited to the example shown in FIG. 6. A person of ordinary skill in the art would know that the numbers of the first type of photodetector board and the second type of photodetector board may be respectively selected with reference to the numbers and types of laser emitter boards within the same multi-beam LiDAR system. According to the present disclosure, the minimum number of the first type of photodetector board may be one, and the minimum number of the second type of photodetector board may be one.

The embodiments illustrated by FIG. 6 further demonstrate that, with respect to the second type of photodetector boards 6201 along a vertical direction (e.g., in the y-axis direction, which is perpendicular to the x-z plane), eight first type of photodetector boards 6101, 6102 are positioned thereabove and the other eight first type of photodetector boards 6301, 6302 are positioned thereunder. The eight first type of photodetector boards 6101, 6102 may form a first group of photodetector boards 610. The four second type of photodetector boards 6201 may form a second group of photodetector boards 620. The eight first type of photodetector boards 6301, 6302 may form a third group of photodetector boards 630. The second group 620 is disposed between the first group 610 and the third group 630. It is understood that the number of photodetector boards in one group is not limited to four or eight. In some embodiments, each group of first type of photodetector boards may include one or more such boards. In other embodiments, the group of second type of photodetector boards may include one or more such boards.

It is further noted that the relative position and number of the first type and second type of photodetector boards are not limited to the example shown in FIG. 6. In one example, there can be at least one first type of photodetector board above one second type of photodetector board. In another example, there can be at least one first type of photodetector board under one second type of photodetector board. In yet another example, there can be at least two first type of photodetector boards on each of the upper and lower sides of the second type of photodetector board(s). In some embodiments, the number of photodetector boards in a group may be adjusted with reference to the number of laser emitter boards in a corresponding group of laser emitter boards within the same multi-beam LiDAR system.

With respect to each second type of photodetector board, it may include two or more photodetectors, according to the present disclosure. In some embodiments, the second type of photodetector board may not be parallel to a predefined plane (e.g., x-z plane). As a result, a photodetector board having multiple photodetectors may be able to receive the multiple return beams that are reflected by an object in the environment from laser beams emitted by multiple laser emitters on one laser emitter board.

Similar to the second type of laser emitter board, the second type of photodetector board may tilt on one side (e.g., one end of the board) to create a position that is non-parallel to the predefined plane. For ease of reference, such a laser emitter board is called a "tilted photodetector board" herein. The tilted photodetector board may tilt towards a predetermined direction (e.g., up, down, left, right, or a combination of two or more of these directions in a three-dimensional space) and may have a tilting angle that ranges between 0 degree and 90 degrees, and preferably can be any value within the range between 0 degree and 30 degrees. When there are more than one tilting photodetector board, the return beams may be received by multiple photodetectors without coinciding with each other. This arrangement of photodetector boards essentially increases the number of return beams received along a vertical direction (e.g., y-axis direction), and thus enhances the vertical resolution of the LiDAR system equipped with such photodetector boards.

Eight first type of photodetector boards 6101, 6102 shown in FIG. 6 may be arranged in a staggered manner along the vertical direction (e.g., y-axis direction). Similar to laser emitter boards 4101, 4102 discussed above in conjunction with FIGS. 4 and 5C, each pair of two adjacent photodetector boards 6101 and 6102 may have a substantial position shift in the lateral direction (e.g., z-axis direction), hence the staggered arrangement along the vertical direction (e.g., y-axis direction). According to these embodiments, there may not be any overlapping between projected images of two adjacent photodetector boards 6101, 6102 when their images are projected horizontally along a lateral direction (e.g., z-axis direction) to a vertical plane (e.g., x-y plane). In an exemplary multi-beam LiDAR system, the amount of shift (not shown) may range between a few millimeters to a few dozens of centimeters (e.g., 2 mm, 3 mm, 5 mm, 1 cm, 2 cm, 3 cm, 5 cm, 10 cm, 20 cm, 30 cm, 50 cm, or in any range defined by any two of these values). When viewed from above in the vertical direction, the projected images of the two adjacent first type of photodetector boards 6101 and 6102 may not substantially overlap on a predefined plane (e.g., x-z plane).

The four photodetector boards 6101 on the right side of FIG. 6, which are stacked closer to the center (e.g., rotation axis) of the multi-beam LiDAR system, may be named herein as the "inner-staggered photodetector boards." The other four photodetector boards 6102, which are stacked further away from the center (e.g., rotation axis) than the inner-staggered photodetector boards, may be named herein as the "outer-staggered photodetector boards." The inner-staggered photodetector boards may not have a substantial or any lateral position shift between any two of them. They can form a line along the vertical direction (e.g., y-axis direction), which is perpendicular to the predefined plane (e.g., x-z plane). Therefore, when reviewed from above in the vertical direction, multiple photodetector boards 6101 may only have one projection image on the predefined plane of substantially the same size as a single photodetector board 6101. The same arrangement may also apply to outer-staggered photodetector boards 6102.

In other embodiments, the projected image of the inner-staggered photodetector boards and that of the outer-staggered photodetector boards may partially or substantially overlap, depending on the location of the photodetectors on the second type of photodetector boards. The photodetectors on the inner-staggered photodetector boards and outer-staggered photodetector boards may respectively form a line along a direction with the photodetectors on the second type of photodetector boards, thus capable of receiving multiple return beams along the direction.

According to embodiments of the present disclosure, the surface area of one inner-staggered photodetector board is smaller than that of one outer-staggered photodetector board. Thus, the overall size of the photodetector array can be controlled while also increasing the density of return beams and resolution of the multi-beam LiDAR system.

Although not shown, when viewed from above along the vertical direction, only one projection image of inner-staggered photodetector boards 6101 and one projection image of outer-staggered photodetector boards 6102 can be seen, which is similar laser emitter boards 4101, 4102. In examples where a third group of first type of photodetector boards are provided under the second group of second type of photodetector boards, such as in FIG. 6, the same staggered arrangement may be applied to the third group of photodetector boards 630, which respectively include inner-staggered photodetector boards 6301 and outer-staggered photodetector boards 6302.

Similar to the second group of laser emitter boards, the second group of photodetector boards may also be aligned along the vertical direction (e.g., y-axis direction). Each pair of two adjacent photodetector boards 6201 in FIG. 6 may not have a substantial or any position shift in the lateral direction (e.g., z-axis direction), hence forming an aligned arrangement along the vertical direction (e.g., y-axis direction).

According to the present disclosure, the first type and the second type of photodetector boards may each include any number of photodetectors. As long as the manufacturing process permits, there can be 1, 2, 3, 4, 5, 10, or even dozens of photodetectors on one photodetector board. In some embodiments, each first type of photodetector boards may include one and only one photodetector. This may shrink the overall size of the device and simplify control of the photodetectors. FIG. 6 demonstrates such an embodiment where each of photodetector boards 6101 has one photodetector 6105, each of photodetector boards 6102 has one photodetector 6106, each of photodetector boards 6301 has one photodetector 6305, and each of photodetector boards 6302 has one photodetector 6306. In some embodiments, the number of photodetectors on a second type of photodetector board may be larger than that of photodetectors on a first type of photodetector board. This allows the photodetector array to increase the density of received return beams directed within an ROI, thus creating higher resolution of the surrounding environment within the FOV of the multi-beam LiDAR system. FIG. 6 demonstrates such an embodiment where each of photodetector boards 6201 has four photodetectors 6205. Because photodetector boards 6201 are positioned in the center area of the photodetector array, with photodetector boards 6101, 6102, 6301, 6302 of fewer onboard photodetectors positioned on the upper and lower sides, multi-beam LiDAR system 300 is able to receive higher density of return beams in the middle part of its FOV.

According to some embodiments consistent with the present disclosure, the photodetector array and the laser emitter array in the same multi-beam LiDAR system may be provided with corresponding configuration (e.g., symmetrical structure), so that the return beams reflected by an object from laser beams that are emitted by any of the laser emitters in the laser emitter array may be captured by the photodetector array. For example, the staggered arrangement of the first type of photodetector boards 6101, 6102, 6301, 6302 shown in FIG. 6 may correspond to the staggered arrangement of the first type of laser emitter boards 4101, 4102, 4301, 4302 shown in FIG. 4A, respectively. As a result, for example, photodetector board 6101 may receive a return beam reflected by an object in the environment from a laser beam that is emitted from laser emitter board 4101. Likewise, the aligned arrangement of second type of photodetector boards 6201 shown in FIG. 6 may correspond to the aligned arrangement of the second type of laser emitter boards 4201 shown in FIG. 4A, and thus photodetector board 6201 may receive a return beam that is emitted from laser emitter board 4201.

In some embodiments, the number of laser emitters and photodetectors on a corresponding pair of laser emitter board and photodetector board may also be the same. Each photodetector may correspond to one laser emitter in these embodiments. Thus, when the multi-beam LiDAR system is in operation, each photodetector may receive a return beam reflected by an object from a laser beam that is emitted from a laser emitter corresponding to that photodetector.

Similar to the tilted second type of photodetector board discussed above, at least one of the first type of photodetector boards is not parallel to a predefined plane (e.g., the x-z plane). In some embodiments, the tilted first type of photodetector board may tilt towards a predetermined direction (e.g., up, down, left, right, front, back, or a combination of two or more of these directions in a three-dimensional space). In other embodiments, the front side (that is, the side where return beams are received by the photodetector mounted on the board) of the tilted first type of photodetector board tilts towards the center of the photodetector array. Moreover, the tilting angles of photodetector boards in the receiver may also be adjusted with reference to the tilting angles of laser emitter boards in the transmitter of the same multi-beam LiDAR system. For example, the tilting angle of a photodetector board may be adjusted to be the same as the titling angle of its corresponding laser emitter board.

In the example illustrated in FIG. 6, an inner-staggered first type of photodetector board 6101 may tilt towards the second group of photodetector boards 620, which is disposed between the first group 610 and the third group 630. This allows the reception of return beams to concentrate towards the middle part of the FOV of the multi-beam LiDAR system, and therefore increases the density of return beams in the part that is vital to the environment sensing. As a result, more details in an ROI of the surrounding environment, including the objects therein, can be captured by a LiDAR system with one or more tilted photodetector boards as compared to the conventional LiDAR system with non-tilted photodetector boards.

The tilting angle of the tilted first type of photodetector board with respect to the predefined plane may be a value within the range between 0 degree and 90 degrees, thus an acute angle. In some embodiments, the tilting angle may be between 0 degree and 30 degrees. It is understood that the tilted photodetector board is not limited to tilting towards the center of the photodetector array. For example, when the tilted photodetector board tilts away from the center of the photodetector array, the received return beams may have a higher density in a peripheral part of the FOV of the multi-beam LiDAR system.

In some embodiments, multiple photodetectors provided on one photodetector board may be equally distributed. In other embodiments where an ROI exists, the photodetectors may not be equally distributed and they can be concentrated within that ROI. With the teaching of the present disclosure, a person of skill in the art would learn that the distribution of the photodetectors (thus the vertical density of the return beams) may be controlled by adjusting one or both of (a) the tilting angle of one or more tilted photodetector boards, and (b) the distribution of multiple photodetectors on one or more photodetector boards. Moreover, the distribution of photodetectors in the receiver may also be adjusted with reference to the distribution of laser emitters in the transmitter of the same multi-beam LiDAR system.

As discussed above, the photodetector array and the laser emitter array in the same multi-beam LiDAR system may be provided with corresponding configuration. In these embodiments, the tilting angle of the tilted photodetector board may be the same as that of its corresponding tilted laser emitter board. Thus, due to reciprocity in optical path between the transmitter and the receiver of the multi-beam LiDAR system, the photodetector array of the receiver in these embodiments may maximize its probability of receiving the return beams reflected from laser beams originated from the laser emitter array of the transmitter.

Similar to the laser emitters, none of the photodetectors on a photodetector board in a group of photodetector boards is of the same elevation from the predefined plane as another photodetector on a photodetector board in the same group of photodetector boards. Furthermore, the elevation of each photodetector may be adjusted with reference to the elevation of its corresponding laser emitter within the same multi-beam LiDAR system.

It is contemplated that the photodetector array according to the present disclosure may include two or more types of photodetector board, of which one type of photodetector board includes more photodetectors than the other type or types of photodetector board. For example, in the embodiments illustrated in FIG. 6, the second type of photodetector boards 6201 includes more photodetectors on each board than the first type of photodetector boards 6101, 6102, 6301, 6302.

Moreover, with respect to one multi-beam LiDAR system, the number of types of photodetector board, the number of groups of photodetector boards, and the number of photodetector boards included in each group may vary according to different needs. The examples described in conjunction with the various figures herein are just for illustrative purpose and should not be construed to limit those numbers. For example, a photodetector array consistent with the present disclosure may include 2, 3, 4, 5, 6, 7, 8, 9, 10, or more types of photodetector board and 2, 3, 4, 5, 6, 7, 8, 9, 10, or more groups of photodetector boards. One group of photodetector boards may include 1, 2, 3, 4, 7, 8, 9, 10, or more photodetector boards.

Referring back to FIG. 3, in some embodiments, multi-beam LiDAR system 300 may also include a transmitter optical unit 330 and a receiver optical unit 340. Transmitter optical unit 330 may be configured to collimate the laser beams emitted from laser emitter array 310. In some embodiments, light-emitting surfaces of laser emitters in laser emitter array 310 may fall within a focal plane of transmitter optical unit 330. The light-emitting surface of laser emitter array 310 may be a surface perpendicular to the central optical axis of laser emitter array 310.

In some embodiments, receiver optical unit 340 may be configured to collect return beams reflected by an object in the surrounding environment and focus the light before it is received by photodetector array 320. The larger aperture receiver optical unit 340 has, the greater number of return beams it may collect. As a result, more return beams may be focused by receiver optical unit 340 and received by photodetector array 320. In some embodiments, light-receiving surfaces of the photodetectors in photodetector array 320 may fall within a focal plane of receiver optical unit 340. The light-receiving surface of photodetector array 320 may be a surface perpendicular to the central optical axis of photodetector array 320. In some embodiments, the central optical axis of transmitter optical unit 330 is parallel to the central optical axis of receiver optical unit 340.

Consistent with some embodiments of the present disclosure, multi-beam LiDAR system 300 may include an optional transmitter reflection mirror group 350 disposed between laser emitter array 310 and transmitter optical unit 330, as illustrated in FIG. 3. Transmitter reflection mirror group 350 may be configured to redirect the laser beams emitted from laser emitter array 310 for collimation by transmitter optical unit 330. In some embodiments, transmitter reflection mirror group 350 may include two reflection mirrors 351 and 352. For example, when laser beams are emitted from laser emitter array 310, they may be first reflected by reflection mirror 351 and then by reflection mirror 352. In this way, the direction of the laser beams may be changed so that transmitter optical unit 330 may emit the reflected laser beams through its aperture. As a result, laser emitter array 310 may not have to be aligned with transmitter optical unit 330. The existence of transmitter optical unit 330 may shrink the size of the transmitter side of multi-beam LiDAR system 300.

In some embodiments, multi-beam LiDAR system 300 may include an optional receiver reflection mirror group 360 disposed between photodetector array 320 and receiver optical unit 340, as illustrated in FIG. 3. Receiver reflection mirror group 360 may be configured to redirect the return beams focused by receiver optical unit 340 for reception by photodetector array 320. In some embodiments, receiver reflection mirror group 360 may include two reflection mirrors 363 and 364. For example, when laser beams are emitted by laser emitter array 310 and reflected by an object, receiver optical unit 340 may receive the return beams through its aperture. Afterward, the return beams may be first reflected by reflection mirror 363 and then by reflection mirror 364. In this way, the direction of the return beams may be changed so that receiver reflection mirror group 360 may redirect the return beams focused by receiver optical unit 340 to one of the photodetector boards that corresponds to the laser emitter board that emits the laser beams. For example, laser beams emitted from first type of laser emitter board 4101 (shown in FIG. 4A) may be reflected by an object, and the return beams may be received by receiver optical unit 340. Receiver reflection mirror group 360 may redirect the return beams focused by receiver optical unit 340 to a first type of photodetector board 6101 (shown in FIG. 6) of photodetector array 320. As a result, photodetector array 320 may not have to be aligned with receiver optical unit 340. The existence of receiver optical unit 340 may shrink the size of the receiver side of multi-beam LiDAR system 300.

In some embodiments, multi-beam LiDAR 300 may include a stationary part 370, a rotating part 380, and a rotating apparatus 390, as shown in FIG. 3. Stationary part 370 may be connected to rotating part 380 through rotating apparatus 390. In some embodiments, rotating apparatus 390 may use a communication module to communicate with rotating part 380. The communication module may have two different implementations. One is to use a wired connection, such as slip rings. The other is to se a wireless connection, such as using electrical or magnetic signals to establish connections through electromagnetic coupling, to connect rotating apparatus 390 with rotating part 380. Rotating apparatus 390 may drive the rotation of rotating part 380.

In some embodiments, rotating part 380 rotates about an axis. The axis may be perpendicular to the predefined plane (e.g., x-z plane). In some embodiments, laser emitter array 310, photodetector array 320, transmitter optical unit 330, receiver optical unit 340, transmitter reflection mirror group 350 and receiver reflection mirror group 360 may be disposed on rotating part 380. Thus, when rotating part 380 rotates, these components rotate together, which may allow multi-beam LiDAR system 300 to perform a 360-degree detection of the surrounding environment.

Figure 7:
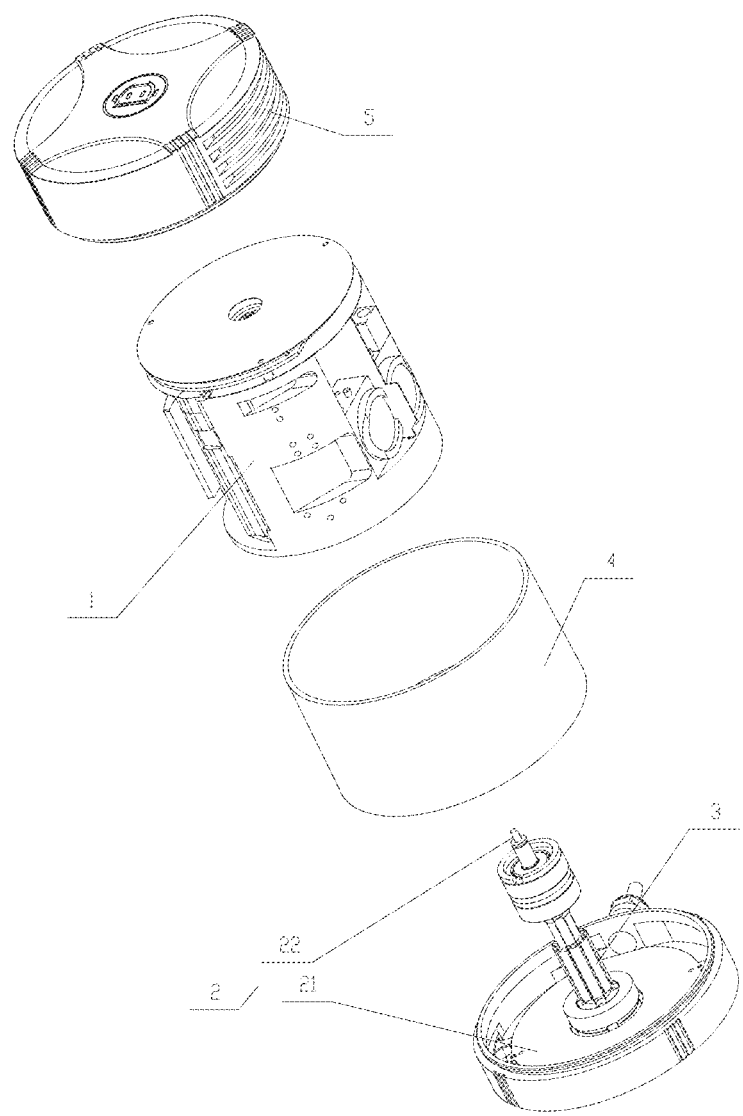
FIG. 7 illustrates an exploded view of an exemplary multi-beam LiDAR system, according to embodiments of the disclosure.
Figure 8:
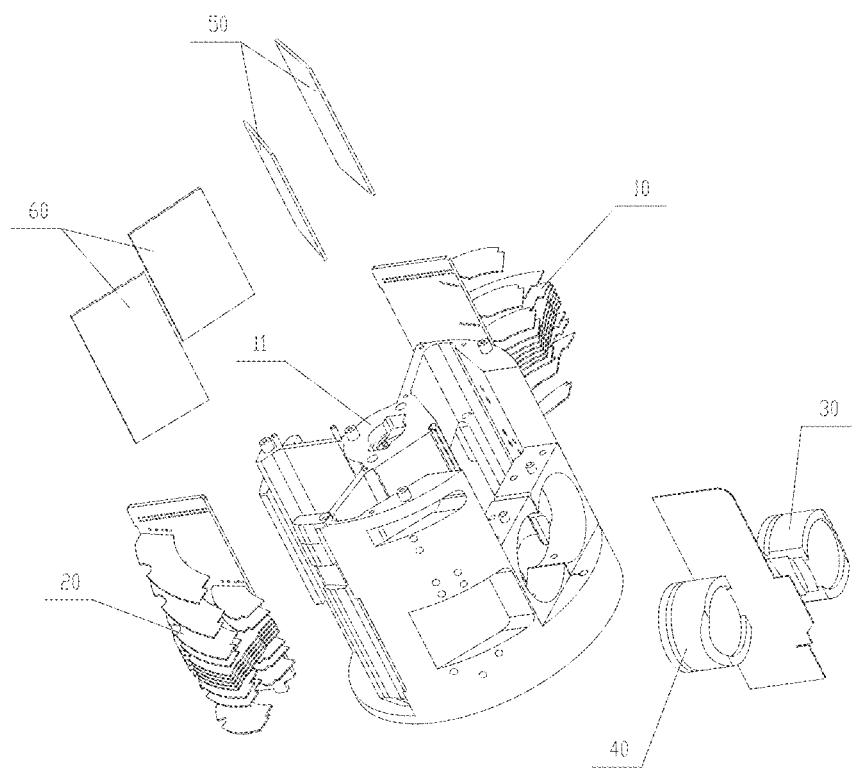
FIG. 8 illustrates an exploded view of an exemplary rotating part of the multi-beam LiDAR system, according to embodiments of the disclosure.

FIGS. 7 and 8 illustrate an internal configuration of an exemplary multi-beam LiDAR system, according to embodiments of the disclosure. In some embodiments, the multi-beam LiDAR system may include a laser emitter array 10, a photodetector array 20, a transmitter optical unit 30, a receiver optical unit 40, a transmitter reflection mirror group 50, and a receiver reflection mirror group 60. Laser emitter array 10 may be configured to emit multiple laser beams to detect objects in the surrounding environment. Photodetector array 20 may be configured to receive return beams reflected by the object and convert the light signals to electrical signals. Laser emitter array 10 may be the same laser emitter array as any one of the laser emitter arrays disclosed in conjunction with FIGS. 3 to 5B. Photodetector array 20 may be the same photodetector array as any one of the photodetector arrays disclosed in conjunction with FIGS. 3 and 6. Transmitter optical unit 30 may be configured to collimate the emitted laser beams. Transmitter reflection mirror group 50 may be configured to redirect the laser beams emitted from laser emitter array 10 for collimation by transmitter optical unit 30. Receiver optical unit 40 may be configured to collect the return beams and focus the received return beams before they reach photodetector array 20. Receiver reflection mirror group 60 may be configured to redirect the return beams focused by receiver optical unit 40 for reception by photodetector array 20. In some embodiments, a center axis of laser emitter array 10 may be parallel to a center axis of photodetector array 20.

Consistent with the embodiments disclosed above and as illustrated in FIGS. 7 and 8, laser emitter array 10, photodetector array 20, transmitter optical unit 30, receiver optical unit 40, transmitter reflection mirror group 50, and receiver reflection mirror group 60 may be disposed on rotating part 1. In some embodiments, rotating part 1 rotates about a rotating shaft 22. A support frame 11 may be disposed on rotating part 1 that supports at least laser emitter array 10 and photodetector array 20. Laser emitter array 10 may be disposed on one side of support frame 11, facing towards the front part of the multi-beam LiDAR system. Photodetector array 20 may be disposed on the other side of support frame 11, facing towards the front part of the multi-beam LiDAR system. Rotating shaft 22 may be fixed to a base 21 of the multi-beam LiDAR system, and rotating shaft 22 and base 21 may form a stationary part 2. Stationary part 2 may be connected to rotating part 1 through a rotating apparatus 3. In some embodiments, rotating shaft 22 may be fixed to the center of base 21.

In some embodiments, the multi-beam LiDAR system may further include a shell 4 and a cover 5. In some embodiments, rotating part 1 is disposed in a cavity encompassed by shell 4 and base 21. In some embodiments, a circuit board may be fixed to base 21. In some embodiments, rotating shaft 22 may include a bearing configured to support rotating part 1, and a motor configured to rotate rotating part 1. The motor may include a rotor and a stator.

The stator may be fixed onto rotating shaft 22 and the rotor may be fixed to rotating part 1.

Figure 9:
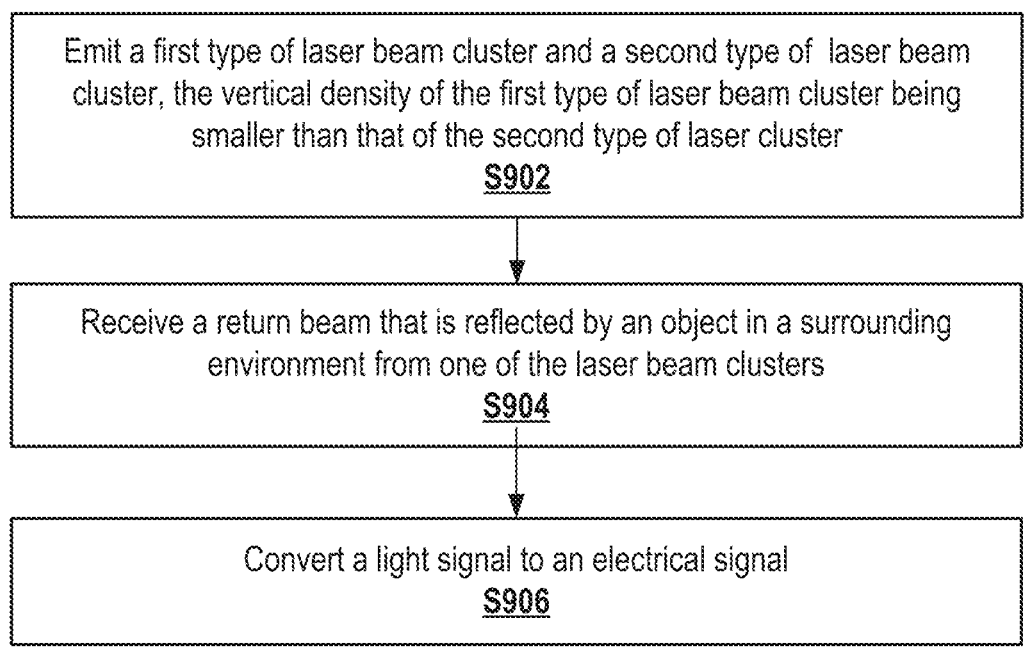
FIG. 9 illustrates a flow chart of an exemplary method for detection using the multi-beam LiDAR system, according to embodiments of the disclosure.

FIG. 9 illustrates a flow chart of an exemplary method 900 for detection by a multi-beam LiDAR system, according to embodiments of the disclosure. In some embodiments, method 900 may be implemented by a multi-beam LiDAR system disclosed herein, which includes a processor that performs various operations. It is to be appreciated that some of the steps may be optional to perform the disclosure provided herein, and that some steps may be inserted in the flowchart of method 900 that are consistent with other embodiments according to the current disclosure. Further, some of the steps may be performed simultaneously, or in an order different from that shown in FIG. 9. It is further understood that the components used in performing method 900 may be implemented by any of the similar or same components described above in more details, which include but not limited to laser emitter array, photodetector array, transmitter, receiver, transmitter optical unit, receiver optical unit, transmitter reflection mirror group, and receiver reflection mirror group.

At step S902, a first type of laser beam cluster and a second type of laser beam cluster may be emitted by a transmitter. In some embodiments, each laser beam cluster may have a plurality of laser beams, and the vertical density of the first type of laser beam cluster is smaller than that of the second type of laser beam cluster. The transmitter may include a laser emitter array that has the same or similar function and configuration as any laser emitter array disclosed herein. In some embodiments, the laser emitter array may include a first type of laser emitter board and a second type of laser emitter board. According to the present disclosure, the second type of laser emitter board may not be parallel to a predefined plane. In other embodiments, the first type of laser emitter board may not be parallel to the predefined plane either.

In some embodiments, a plurality of the first type of laser emitter boards may be staggered along the vertical direction. A plurality of the second type of laser emitter boards may be aligned along the vertical direction. In some embodiments, the number of laser emitters on one first type of laser emitter board may be smaller than that of laser emitters on one second type of laser emitter board. Thus, when the second type of laser emitter board is positioned in the center of the laser emitter array, the laser beam density in the middle part of the FOV of the multi-beam LiDAR system is higher than that in the peripheral part of the same FOV.

At step S904, a return beam that is reflected by an object in the surrounding environment from one of the laser beam clusters is received by a receiver. The receiver may include a photodetector array that has the same or similar function and configuration as any photodetector array disclosed herein. In some embodiments, the photodetector array may include a first type of photodetector board and a second type of photodetector board. According to the present disclosure, the second type of photodetector board may not be parallel to the predefined plane. In other embodiments, the first type of photodetector board may not be parallel to the predefined plane either.

In some embodiments, a plurality of the first type of photodetector boards may be staggered along the vertical direction. A plurality of the second type of photodetector boards may be aligned along the vertical direction. In some embodiments, the number of photodetectors on one first type of photodetector board may be smaller than that of photodetectors on one second type of photodetector board. Thus, when the second type of photodetector board is positioned in the center of the photodetector array, the return beam density received in the middle part of the FOV of the multi-beam LiDAR system is higher than that in the peripheral part of the same FOV.

At step S906, light signals embodied in the return beams may be converted into electrical signals (e.g., current signals or voltage signals) by a processor. The converted electrical signals may be amplified by an amplifier (e.g., a transimpedance amplifier) and may further be processed to generate data, such as point clouds.

Although not shown in FIG. 9, the method for detection by a multi-beam LiDAR system may include the following optional steps. The laser beams emitted from the laser emitter array may be collimated by a transmitter optical unit. Light-emitting surfaces of laser emitters in the laser emitter array may fall within a focal plane of the transmitter optical unit. The return beams reflected by the object may be focused by a receiver optical unit. Light-receiving surfaces of the photodetectors in the photodetector array may fall within a focal plane of the receiver optical unit. In some embodiments, an optical axis of the transmitter optical unit may be parallel to an optical axis of the receiver optical unit. The laser beams emitted from the laser emitter array may be redirected by an optional transmitter reflection mirror group before being collimated by the transmitter optical unit. The transmitter reflection mirror group may be disposed between the laser emitter array and the transmitter optical unit. The return beams focused by the receiver optical unit may be redirected by an optional receiver reflection mirror group before being received by the photodetector array. The receiver reflection mirror group may be disposed between the photodetector array and the receiver optical unit.

The method for detection by a multi-beam LiDAR system according to the present disclosure may have the benefit of generating a larger number of laser beams within a unit length along a direction than the conventional method, thus obtaining a higher resolution of images along that direction. Also, the method may prioritize the part of the FOV of the multi-beam LiDAR system that the operator wants to find most of the information in the surrounding environment. Furthermore, the multi-beam LiDAR system implementing the method excels in its compact size due to the various design change in the layouts of laser emitter boards, photodetector boards, reflection mirror groups, etc.

It will be apparent to those skilled in the art that various modifications and variations can be made to the disclosed systems and related methods. Other embodiments will be apparent to those skilled in the art from consideration of the specification and practice of the disclosed systems and related methods.

It is intended that the specification and examples be considered as exemplary only, with a true scope being indicated by the following claims and their equivalents.

What is claimed is:

1. A multi-beam LiDAR system, comprising:
   a transmitter having an array of laser emitters, each laser emitter being configured to emit a laser beam,
   wherein the laser emitter array comprises a plurality of a first type of laser emitter boards and a second type of laser emitter board,
   wherein the second type of laser emitter board comprises two or more laser emitters and is not parallel to a predefined plane,
   wherein the plurality of the first type of laser emitter boards are staggered along a vertical direction perpendicular to the predefined plane, wherein the plurality of the first type of laser emitter boards comprise one or more inner-staggered laser emitter boards and one or more outer-staggered laser emitter boards, wherein the one or more inner-staggered laser emitter board is staggered closer to the center of the multi-beam LiDAR system than the one or more outer-staggered laser emitter board, and wherein the inner-staggered laser emitter board has a surface area smaller than the outer-staggered laser emitter board.

2. The multi-beam LiDAR system of claim 1, wherein the first type of laser emitter board is not parallel to the predefined plane.

3. The multi-beam LiDAR system of claim 1, wherein the number of laser emitters on a second type of laser emitter board is larger than the number of laser emitters on a first type of laser emitter board.

4. The multi-beam LiDAR system of claim 1, wherein each second type of laser emitter board forms an acute angle with the predefined plane.

5. The multi-beam LiDAR system of claim 1, wherein images of two adjacent first type of laser emitter boards projected to the predefined plane do not substantially overlap.

6. The multi-beam LiDAR system of claim 1, wherein a first plurality of the first type of laser emitter boards form a first group of laser emitter boards, a second plurality of the second type of laser emitter boards form a second group of laser emitter boards, and a third plurality of the first type of laser emitter boards form a third group of laser emitter boards, and wherein the second group of laser emitter boards is disposed between the first group of laser emitter boards and the third group of laser emitter boards.

7. The multi-beam LiDAR system of claim 1, wherein none of the laser emitters on a laser emitter board in a group of laser emitter boards is of the same elevation from the predefined plane as another laser emitter on a laser emitter board in the same group of laser emitter boards.

8. A multi-beam LiDAR system, comprising:
a receiver having an array of photodetectors, each photodetector being configured to receive at least one return beam that is reflected by an object from a laser beam of the system,
wherein the photodetector array comprises a plurality of the first type of photodetector boards and a second type of photodetector board, and
wherein the second type of photodetector board comprises two or more photodetectors and is not parallel to a predefined plane,
wherein the plurality of the first type of photodetector boards are staggered along a vertical direction perpendicular to the predefined plane,
wherein the plurality of the first type of photodetector boards comprise one or more inner-staggered photodetector boards and one or more outer-staggered photodetector boards,
wherein the one or more inner-staggered photodetector board is staggered closer to the center of the multi-beam LiDAR system than the one or more outer-staggered photodetector board, and
wherein the inner-staggered photodetector board has a surface area smaller than the outer-staggered photodetector board.

9. The multi-beam LiDAR system of claim 8, wherein the first type of photodetector board is not parallel to the predefined plane.

10. The multi-beam LiDAR system of claim 8, wherein the number of photodetectors on a second type of photodetector board is larger than the number of photodetectors on a first type of photodetector board.

11. The multi-beam LiDAR system of claim 8, wherein each first type of photodetector board comprises one and only one photodetector.

12. The multi-beam LiDAR system of claim 8, wherein each of the second type of photodetector boards forms an acute angle with the predefined plane.

13. The multi-beam LiDAR system of claim 8, wherein images of two adjacent first type of photodetector boards projected to the predefined plane do not substantially overlap.

14. The multi-beam LiDAR system of claim 8, wherein a first plurality of the first type of photodetector boards form a first group of photodetector boards, a second plurality of the second type of photodetector boards form a second group of photodetector boards, and a third plurality of the first type of photodetector boards form a third group of photodetector boards, and wherein the second group of photodetector boards is disposed between the first group of photodetector boards and the third group of photodetector boards.

15. The multi-beam LiDAR system of claim 14, wherein none of the photodetectors on a photodetector board in a group of photodetector boards is of the same elevation from the predefined plane as another photodetector on a photodetector board in the same group of photodetector boards.

16. A method for detection by a multi-beam LiDAR system, comprising:
emitting, by a transmitter, a first type of laser beam cluster and a second type of laser beam cluster, each laser beam cluster having a plurality of laser beams,
wherein the vertical density of the first type of laser beam cluster is smaller than that of the second type of laser beam cluster,
wherein the transmitter has an array of laser emitters, which comprises a first type of laser emitter board and a second type of laser emitter board, and
wherein the second type of laser emitter board is not parallel to a predefined plane,
wherein the first type of laser beam cluster comprises a plurality of a first type of laser emitter boards,
wherein the plurality of the first type of laser emitter boards are staggered along a vertical direction perpendicular to the predefined plane,
wherein the plurality of the first type of laser emitter boards comprise one or more inner-staggered laser emitter boards and one or more outer-staggered laser emitter boards,
wherein the one or more inner-staggered laser emitter board is staggered closer to the center of the multi-beam LiDAR system than the one or more outer-staggered laser emitter board, and
wherein the inner-staggered laser emitter board has a surface area smaller than the outer-staggered laser emitter board.

* * * * *